United States Patent [19]

Ganoung

[11] Patent Number: 5,326,119
[45] Date of Patent: Jul. 5, 1994

[54] BICYCLE AND MOPED SUSPENSION

[76] Inventor: David P. Ganoung, 2800½ Candelaria, NW, Albuquerque, N. Mex. 87107

[21] Appl. No.: 937,733

[22] Filed: Sep. 1, 1992

[51] Int. Cl.⁵ .............................................. B62M 1/20
[52] U.S. Cl. .............................. 280/226.1; 280/220; 280/221; 280/227; 280/275
[58] Field of Search ............... 280/275, 278, 287, 220, 280/221, 281.1, 226.1, 227, 230, 253, 255

[56] References Cited

U.S. PATENT DOCUMENTS 4,266,794  5/1981  Bals ................................ 280/226.1
4,561,668  12/1985  Klopfenstein .................. 280/226.1

FOREIGN PATENT DOCUMENTS 457307  11/1936  United Kingdom ............. 280/226.1

*Primary Examiner*—Mitchell J. Hill

[57] ABSTRACT

A suspension system includes a long-travel suspension configuration for the seat of a bicycle. For instance, this long-travel arrangement could take the form of either a spring-loaded telescoping seat tube mechanism or a single-leaf spring extending horizontally from the seat to a forward attachment point fairly near the steering head. In order to prevent the constant bobbing up and down that this type of suspension usually causes when the rider is pedaling, the suspension also includes a second suspension mechanism which allows the pedal-and-crank assembly to move substantially in unison with the seat. However, this coordinated suspension movement occurs only over bumps and obstacles of relatively moderate size because the total suspension travel of the pedal-and-crank assembly, on a sort of reversed swingarm arrangement, is only about half the overall travel of the seat. A simple cable connection between the two otherwise separate suspension mechanisms transfers upward spring force to the pedal-and-crank assembly and, most importantly, permits the seat to continue its jounce suspension travel well after the pedal-and-crank assembly has bottomed out. In this way, the seat has a long, comfortable suspension travel with neither an excessively high seating position for the rider nor pedal clearance problems at full suspension jounce.

20 Claims, 6 Drawing Sheets

BICYCLE AND MOPED SUSPENSION

BACKGROUND OF THE INVENTION

1. Field of the Invention

This invention relates to suspension systems for bicycle and moped type vehicles.

2. Description of the Prior Art

Most of the different arrangements now used for bicycle suspension systems are adaptations of motorcycle suspension. Because of the differences between bicycles and motorcycles, however, this approach yields rather limited success. As one illustration of this fact, the need for the rider to pedal a bicycle, and to nearly straighten his or her legs at the bottom of each pedal stroke, makes ground clearance much more of a problem for bicycles than for motorcycles. As a result, maintaining adequate ground clearance with conventional configurations of long-travel suspension would necessitate an excessively high seating position for the rider of a bicycle. Instead, bicycle suspension systems have reduced travel in comparison to the motorcycle type suspension from which they are most often derived.

Since a bicycle rider by himself accounts for the great majority of the overall weight of the bicycle and rider together, the tradeoff between suspension travel and height of the overall center of mass is further compromised. In other words, bicycles already have a very high center of mass when the rider is aboard, and moving the rider's seating position upward a given amount, to thereby provide sufficient ground clearance at full suspension jounce (compression), will elevate the center of mass by an almost equal amount. The same is not true of moving the rider of a motorcycle to a higher seating position because the weight of the machine alone is usually significantly greater than the weight of the rider.

At the same time, the fact that the bicycle itself accounts for only a small portion of its overall operational weight offers an opportunity that motorcycle type of suspension fails to exploit. More specifically, suspending a bicycle frame as well as the rider little changes the overall percentage of weight that remains unsprung, but it causes the geometry of the bicycle frame to change as the suspension system functions. Suspending just the seat of a bicycle does take advantage of the low eight of the bicycle in comparison to the rider, but it also causes the rider to bob up and down with each pedal stroke.

SUMMARY OF THE INVENTION

In view of the above, it is therefore an object of the invention to provide method and apparatus for suspending the rider of a bicycle through a long and thus comfortable suspension travel, but without at the same time incurring the disadvantage of either an excessively high seating position for the rider or inadequate ground clearance for pedals of the bicycle when full suspension jounce is approached.

It is also an object of the invention to provide a bicycle suspension system which has a long overall suspension travel, but at the same time avoids the changes in frame geometry normally associated with the operation of long-travel bicycle suspension systems as adapted from motorcycles.

It is another object of the invention to provide two-stage method and apparatus for suspending the rider of a bicycle.

It is yet another object of the invention to preclude long-travel suspension for the seat of a bicycle from causing continuous bobbing up and down of the rider during pedaling while seated.

It is still another object to present a suspension system effective for moped type vehicles as well as for bicycles.

In accordance with the invention in its broad aspect, method and apparatus for suspending the rider of a bicycle are presented. The apparatus includes a mechanism for suspending the seat of the bicycle, a mechanism for suspending the pedal-and-crank assembly of the bicycle and means for linking the resulting suspension motion of the seat to the resulting suspension motion of the pedal-and-crank assembly. In an especially preferred approach, the mechanism for suspending the seat is mechanically distinct from the mechanism for suspending the pedal-and-crank assembly, but a simple tension element such as a cable links the two mechanisms together. Since this cable allows the seat to continue moving in the direction of suspension jounce well after the pedal-and-crank assembly has bottomed out, the comfort of long-travel suspension is obtained without the disadvantages usually associated with employing long-travel suspension on bicycles.

BRIEF DESCRIPTION OF THE DRAWING

The present invention is illustrated in the accompanying drawing, in which.

As used in different figures of the drawing, the same reference numeral denotes the same component or part.

DESCRIPTION OF THE PREFERRED EMBODIMENT

Figure 1:
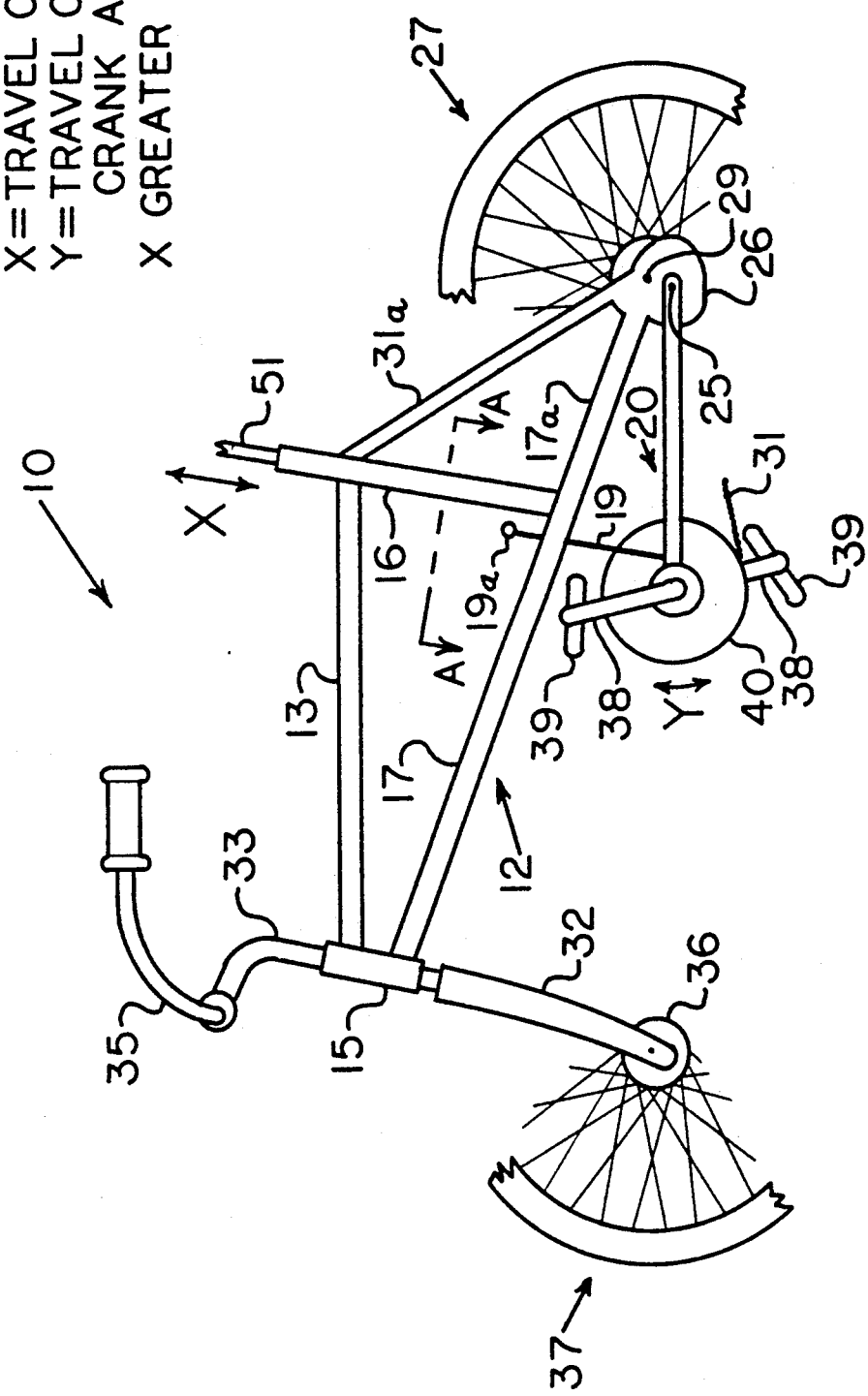
FIG. 1 is a view showing the assembly and major features of a bicycle embodying a preferred variation of the present invention.

FIG. 1 depicts how a bicycle 10 would be designed to incorporate a suspension system according to the present invention. Like the main frame of one type of entirely conventional bicycle, the main frame 12 in FIG. 1 has a top tube 13 which extends in a substantially horizontal direction from a steering head 15 rearward to a seat tube 16. In other words, the top tube 13 is welded, brazed or otherwise suitably joined to the steering head 15 at the forward end of the tube 13 and also permanently joined to the seat tube 16 at the rearward end of the tube 13. Similarly, the down tube 17 is permanently joined to each of the steering head 15 and the seat tube 16, but the down tube 17 meets the seat tube 16 at the lower end of the tube 16 as shown.

Figure 2A:
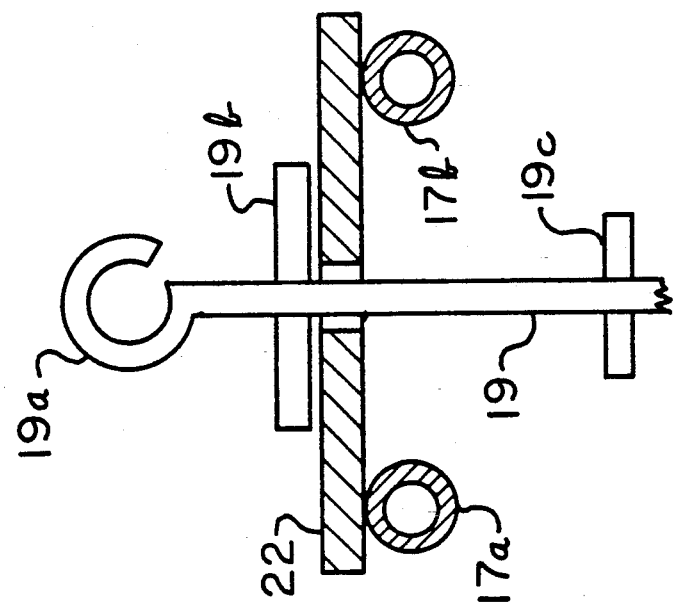
FIG. 2a presents section B—B from FIG. 2.
Figure 2:
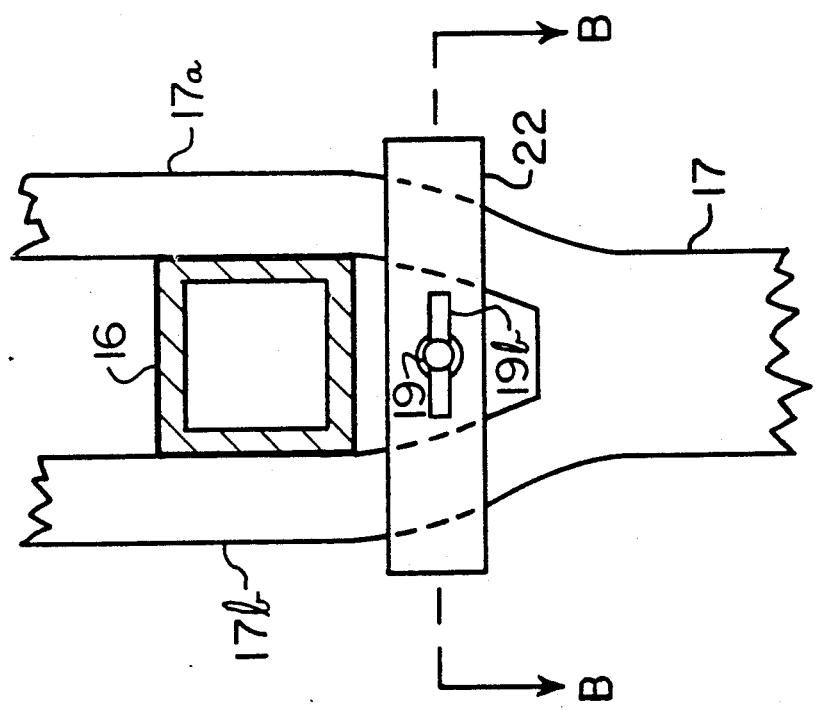
FIG. 2 presents view A—A from FIG. 1.

By presenting an enlargement of orthogonal view A—A from FIG. 1, FIG. 2 reveals that the down tube 17 actually splits into lefthand tube 17a and righthand tube 17b a short distance forward of joining the seat tube 16. (Right and left are determined herein form the perspective of a person riding the bicycle 10.) Although not specifically shown in the drawing, the top tube 13 similarly branches a few inches or so forward of its joint with the seat tube 16. Also shown in FIG. 2 is the square cross-sectional shape of the seat tube 16.

FIG. 2a presents orthogonal section B—B from FIG. 2 to more clearly illustrate that the suspension rod 19 has an eye 19a integrally formed at its upper end and that the rod 19 passes between the branched tubes 17a and 17b forward of their attachment to the seat tube 16. In fact, the down tube 17 branches forward of meeting the seat tube 16 in order that the suspension rod 19 may also be located forward of the seat tube 16. The rod 19 extends downward to a simple pivoting joint which securely attaches the rod 19 to the pivoted fork assembly 20 near the forward end of the assembly 20, as seen in FIG. 1.

FIG. 2a also reveals that the suspension rod 19 has a crossbar 19b integrally formed near the eye 19a at the very top of the rod 19. FIG. 2a shows this upper crossbar 19b in contact with the jounce plate 22, which is securely attached to the down tube branches 17a and 17b in the locations indicated by viewing FIG. 2 and FIG. 2a together. Although not specifically shown in FIG. 2a, the jounce plate 22 preferably utilizes sandwich construction of a relatively thick rubber layer permanently bonded between two thinner metal layers to thereby cushion downward impact of the crossbar 19b against the jounce plate 22 during actual operation of the present invention, to be considered later.

Since FIG. 2 and FIG. 2a viewed together also show that the suspension rod 19 passes through a hole formed in the jounce plate 22, it is clear that FIG. 2a does portray the limit of downward travel imposed on the suspension rod 19 by its integral crossbar 19b in combination with the jounce plate 22. As a result, the cross bar 19b and the jounce plate 22 also cooperate to limit rotation in the counterclockwise direction in FIG. 1 of the pivoted fork assembly 20 about the pivot axis 25 as supported by the lefthand side plate 26 of the main frame 12 and by a mirror-image side plate on the other side of the rear wheel assembly 27 for the bicycle 10. This other side plate is of course the righthand side plate hidden in FIG. 1 by the lefthand side plate 26. Finally in FIG. 2a, the lower crossbar 19c of the suspension rod 19 limits rebound travel of the rod 19.

Figure 3:
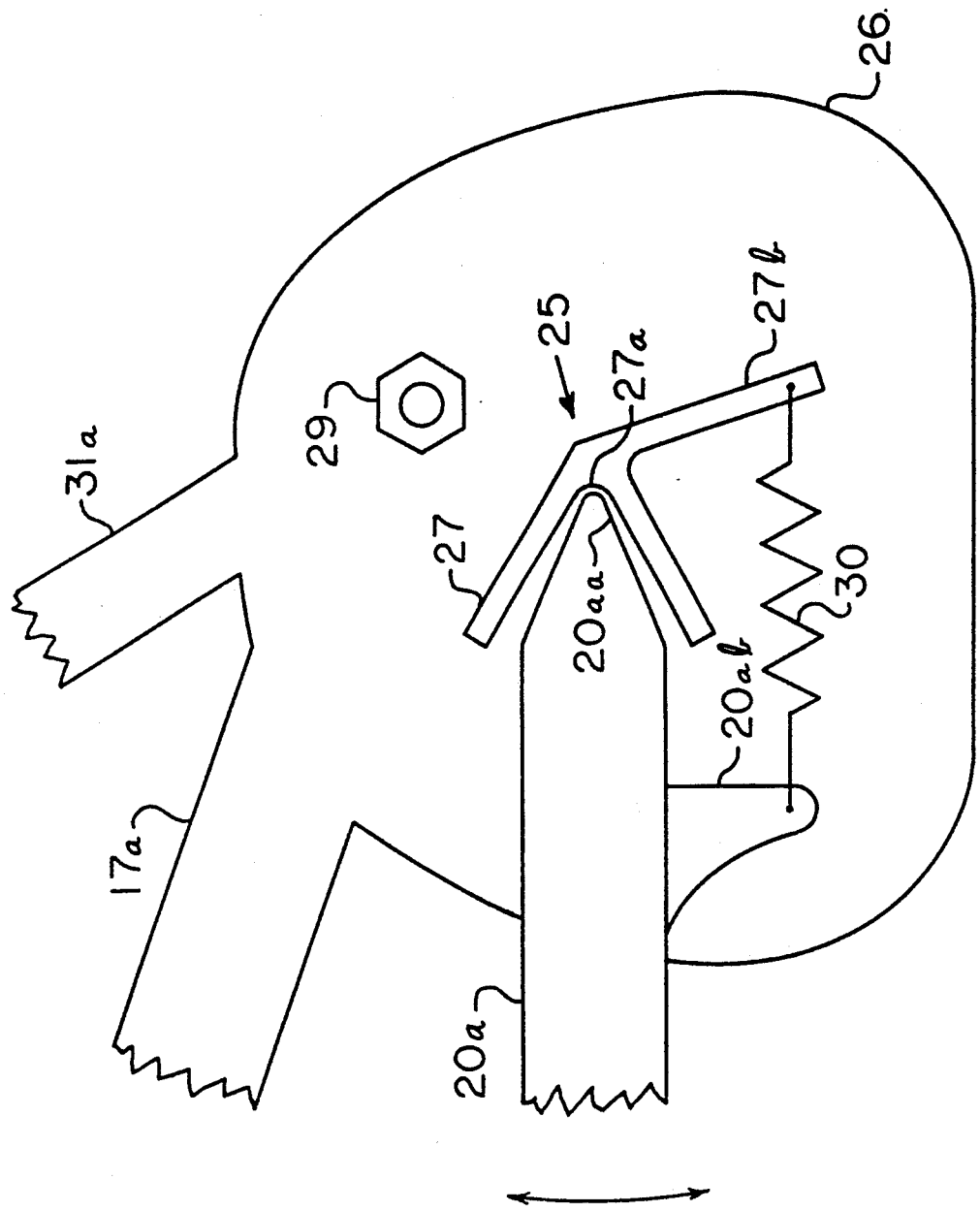
FIG. 3 shows an enlarged view of the pivot 25 for the mechanism which suspends the pedal-and-crank assembly of the bicycle of FIG. 1.
Figures 4, 4A:
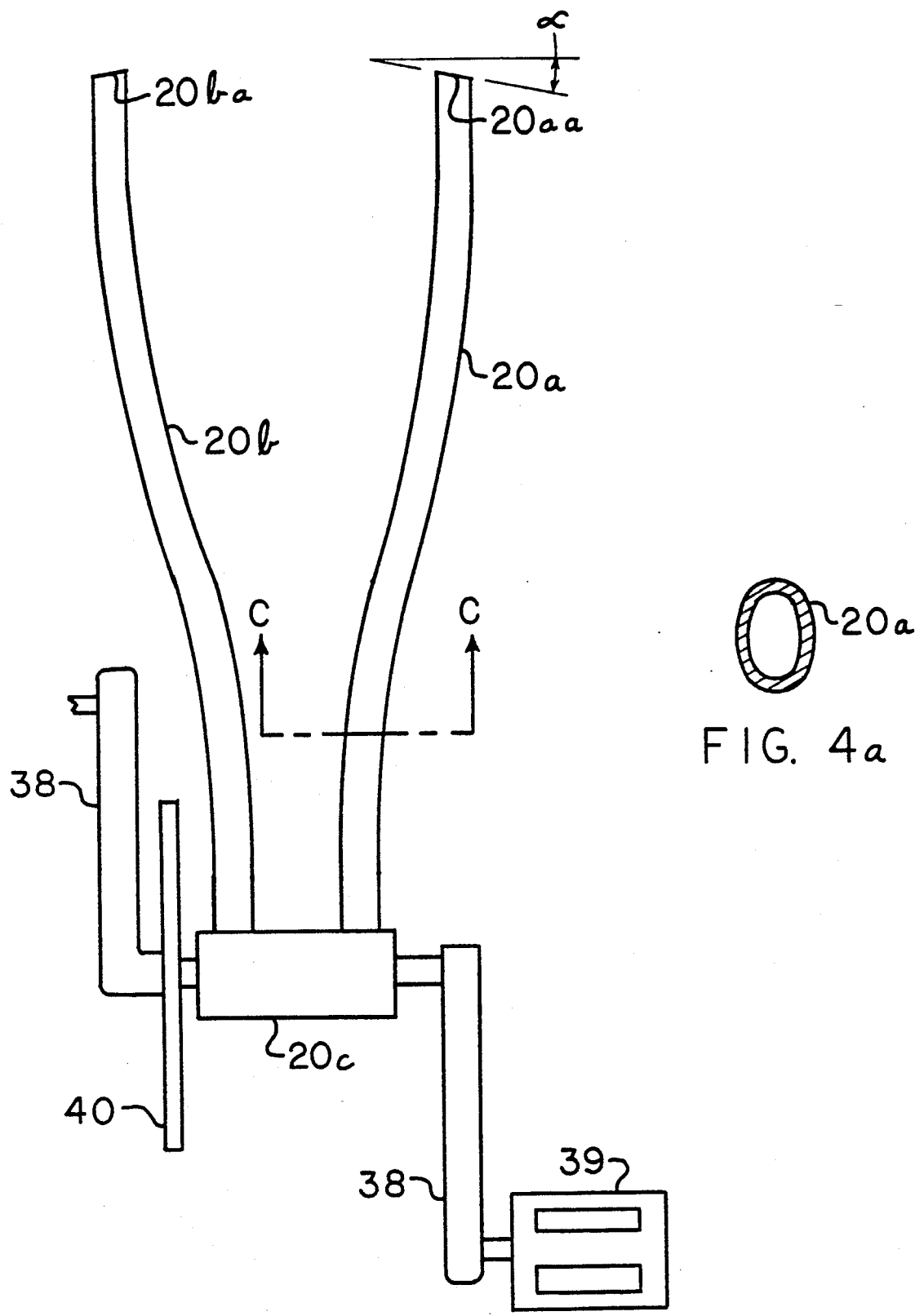
FIG. 4 presents a view looking down on the pedal-and-crank assembly components and the horizontal fork 20 which pivotally attaches these pedal-and-crank components to the bicycle of FIG. 1.
FIG. 4a presents section C—C from FIG. 4.

FIG. 3 reveals more detail about the preferred method for attaching the pivoted fork assembly 20 to the main frame 12, but first, a quick look ahead to FIG. 4 will confirm the basic configuration of the fork assembly 20. The enlarged view presented in FIG. 3 illustrates the lefthand side plate 26 of the main frame 12 along with the portion of the lefthand fork tube 20a located just outboard of the side plate 26. The preferred type 25 of pivot for anchoring the fork tube 20a to the side plate 26 utilizes a V-shaped pivot guide 27 welded, bolted or otherwise securely attached to the side plate 26 in the position shown, with the base 27a of the V-shape in the guide 27 being located as close as is practical to the axle 29 which supports the rear wheel assembly 27 (FIG. 1) in the main frame 12.

The pivot guide 27 accepts the rearward end 20aa of the fork tube 20a because, like the pivot guide 27, this end 20aa is V-shaped in all of its cross sections parallel to the geometric plane of FIG. 3. The cross-sectional V-shape of the fork tube end 20aa subtends an arc at least about 15 degrees less than subtended by the V-shaped pivot guide 27 so that the fork tube 20a can pivot against the guide 27 through a suitable arc of motion. A tension spring 30 holds the end 20aa of fork tube 20a against the base 27a of the pivot guide 27 by pulling the tab 20ab, welded to the fork tube 20a, rearward toward the auxiliary arm 27b of the pivot guide 27. The location of this spring 30 below the fork tube 20a creates a moderate torque tending to rotate the pivoted fork assembly 20 counterclockwise about the pivot 25 in FIG. 1.

The righthand side of the bicycle 10 of course employs a mirror-image of the configuration illustrated in FIG. 3, except that the lefthand spring 30 pulls the fork tube 20a into the pivot guide 27 with a force of roughly 100 pounds, while the righthand fork tube 20b (FIG. 4) does not require nearly so much spring force due to the tension force existing in the top span of the drive chain 31 (FIG. 1). Not shown in the drawing is an optional rubber boot for excluding dirt and water from the pivot 25.

Since FIG. 3 is an enlarged view, it more clearly shows that the side plate 26 forms the rearmost part, on the lefthand side, of the main frame 12 due to welding, brazing or other permanent attachment of the side plate 26 to each of the lefthand tubes 17a and 31a. As shown in FIG. 1, the tube 31a also attaches permanently to the seat tube 16 and is thus one of the two seat stays of the main frame 12.

Remaining features in FIG. 1 which conform to entirely conventional practice include a front fork 32 that extends into the steering head 15 and supports the handlebar stem 33 therein. The stem 33 in turn carries the handlebar assembly 35, and the front fork 32 carries the hub unit 36 of the front wheel assembly 37 for the bicycle 10.

Quite obviously, however, the main frame 12 departs from conventional practice by not directly carrying the bearing housing 20c (FIG. 1 and FIG. 4) for the pedal-and-crank assembly which includes the crank arms 38, pedals 39 and chain ring 40 as well as the housing 20c. To be more specific, the down tube 17 of the main frame 12 extends backward directly toward the rear wheel axle 29, rather than directly toward the bearing housing 20c. Further extension of the seat tube 16 to well below the down tube branches 17a and 17b would allow the tube 16, in conjunction with another short auxiliary frame tube used for triangulation, to directly carry the bearing housing 20c, as in the completely conventional type of bicycle frame after which the main frame 12 is patterned. Instead, the pivoted fork assembly 20 allows the housing 20c to move through an arc of about 10 or 11 degrees to thereby approximate about 3 inches of linear travel relative to the main frame 12 in a direction between vertical and parallel to the slightly inclined-from-vertical orientation of the seat tube 16.

By assuming an orientation looking down on the pivoted fork assembly 20, FIG. 4 reveals some details not seen in any of the previous drawing figures. In particular, the very end portion 20aa of fork tube 20a abutts the guide piece 27 in FIG. 3 at a shallow (a few degrees) angle alpha, shown exaggerated in FIG. 4. So not only must the fork tube 20a be designed to accommodate this angle alpha, but so must the guide piece 27. The purpose of the angle alpha is to keep the fork tube 20a consistently spaced adjacent the side plate 26, and the other fork tube 20b also employs the same technique.

FIG. 4 further shows that both of the fork tubes 20a and 20b are welded or otherwise permanently joined to the bearing housing 20c, within which are bearings for the shaft 50 of the pedal-and-crank assembly of the bicycle 10. (The shaft 50 and its associated bearings are commonly known as the "bottom bracket." However, this terminology suggests the function of a housing or bracket located at the bottom of a bicycle frame, rather than the function of the shaft and bearings within the housing. Because of this ambiguity, the term "bottom bracket" is avoided in the present description.) Although just a single chainring 40 is shown mounted on the shaft 50, a derailleur arrangement with additional chainrings can of course be utilized. If so, the front derailleur for the bicycle 10 would be mounted on a bracket attached to the bearing housing 20c (but not shown).

Of paramount importance to the design of the pivoted fork 20 is the oscillating torque generated by the rider of the bicycle 10 alternating his pedaling force back and forth between the pair of pedals 39. To minimize flexing due to this oscillating torque, each of the fork tubes 20a and 20b should be ovalized in the vicinity of the bearing housing 20c as shown in FIG. 4a for section C—C from FIG. 4. In other words, the oval cross section of tube 20a as seen in FIG. 4a increases the section modulus of tube 20a about a neutral axis that is horizontal in FIG. 4a. This section modulus preferably increases with increasing proximity to the bearing housing 20c, and the attachment of the fork tubes 20a and 20b to the housing 20c should be especially strong and rigid. Making the span across the tubes 20a and 20b as wide as practical, including at the tube ends 20aa and 20ba, will restrict flexing of the pivoted fork 20 during pedaling as well as reduce the amount the spokes of the rear wheel assembly 27 (FIG. 1) must be dished to accommodate a large number of sprocket cogs for the rear wheel 27. In any case, the section modulus just mentioned with reference to FIG. 4a must be much greater than for the chain stays of a conventional bicycle frame.

Figure 5:
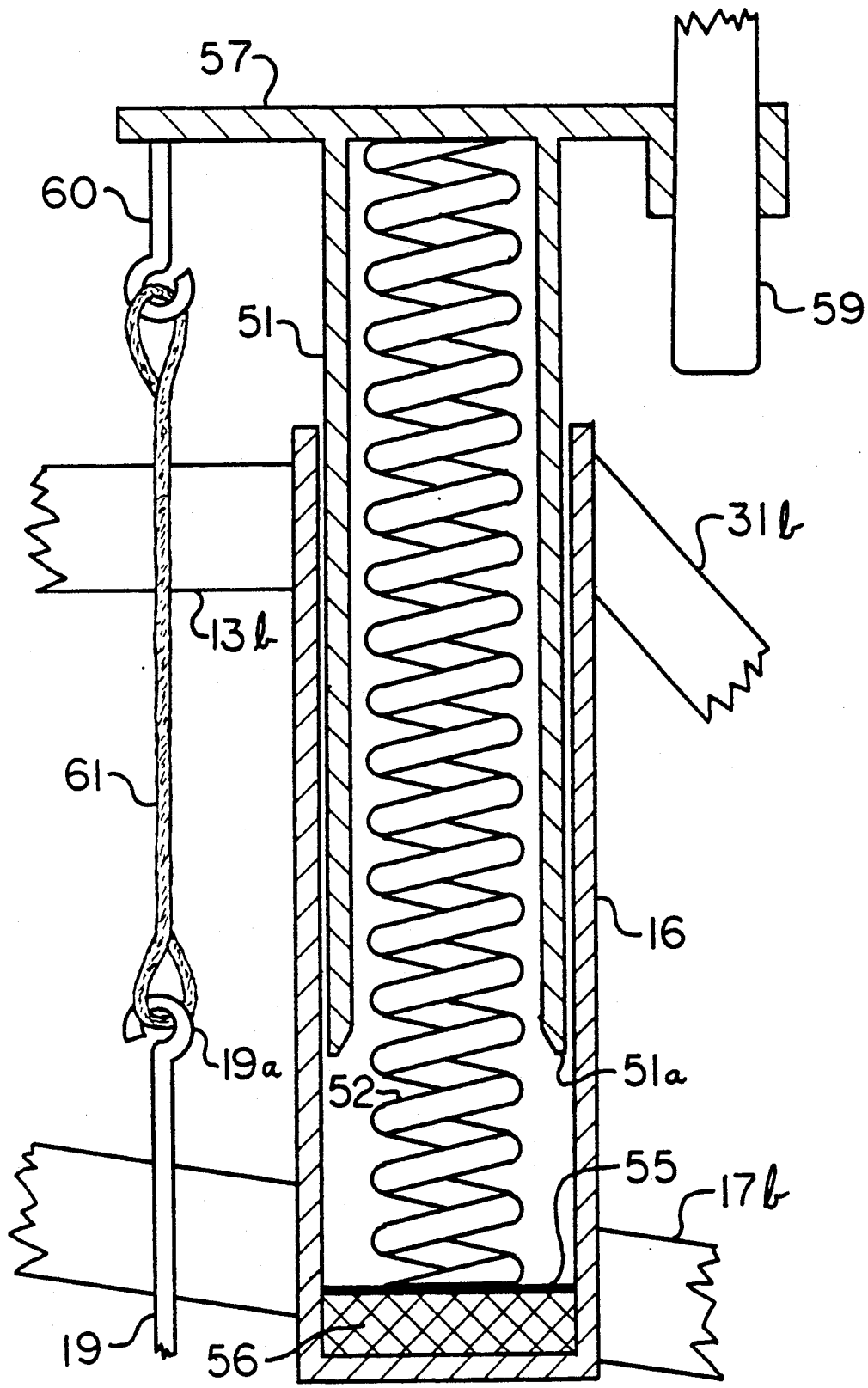
FIG. 5 presents a sectioned and enlarged view of the spring-loaded, telescoping seat tube arrangement of the bicycle of FIG. 1.

Moving on now to FIG. 5, we see an enlarged cross section of the seat tube 16 from FIG. 1. Since the (vertical) geometric plane of this cross section passes midway between the branched tubes 17a and 17b in FIG. 2, only tube 17b is seen in FIG. 5, with the suspension rod 19 passing in front of it. Similarly, only the righthand tubes 13b and 31b are seen in FIG. 5. For clarity in FIG. 5, section lines are omitted from some of the components such as the rod 19.

Like the seat tube 16, the slider 51 has a hollow, square cross-sectional shape in a geometric plane normal to the direction of telescoping movement of the slider 51 within the seat tube 16. More specifically, the slider 51 fits into the open, upper end of the seat tube 16 with an appropriately small, positive clearance for the slider 51 to smoothly slide up and down relative to the main frame 12 while the slider 51 positions the full weight of a rider of the bicycle 10. Heavy grease will lubricate this sliding contact between the slider 51 and the closely enveloping seat tube 16 and at the same time inherently provide suspension damping. Not explicitly represented in the drawing is a rubber boot installed between the upper ends of the slider 51 and the seat tube 16 to exclude water, dirt and any other contaminants from the sliding contact area between these two telescoping sections 16 and 51 of square tube.

A compression spring 52 fits within the telescoping tubes 16 and 51 to thereby provide the suspension spring force for helping isolate the rider of the bicycle 10 from abrupt and extreme movements of the main frame 12 as caused by riding the bicycle 10 over rough surfaces. The bottom of the spring 52 is attached to a metal plate 55 which is in turn permanently bonded to a rubber biscuit 56. This biscuit 56 and its protective metal plate 55 function as the suspension jounce limiter for motion of the slider 51 relative to the seat tube 16. Which is to say that the lower end 51a of the slider 51 strikes the metal plate 55 distinctly before the top plate 57 can strike the top of the seat tube 16. (This of course requires that the length measured inside the seat tube 16 be less than the length of the slider 51 plus the compressed height of the jounce limiter components 55 and 56.) In this way, the rubber biscuit 56 cushions the full jounce travel of the suspension system for the bicycle 10. The plate 55 attaches to the spring 52 merely to provide a convenient way of installing and removing the jounce limiter 55 and 56 from the bottom of the inside of the seat tube 16.

The top plate 57 is welded or otherwise permanently attached to the top of the slider 51 and rigidly carries both of the seat post 59 and the upper cable eye bolt 60. The top plate 57 includes provision for height adjustment of the seat post 59 relative to the slider 51, and full suspension travel of the seat post 59 requires sufficient separation of the seat stays of which stay 31b is the righthand stay. Not explicitly shown in the drawing is the actual seat of a basically conventional bicycle seat assembly which includes the seat post 59.

Other than exchanging the spring 52 for another spring having different characteristics, the apparatus as illustrated in FIG. 5 does not include any means of adjustment for riders of different body weight. Nevertheless, a simple thumbwheel adjustment could be incorporated into the top plate 57 of the slider 51 as follows. First, the top of the spring 52 would attach to or simply abut a square plate within the square cross section of the slider 51. Since the square shape of this plate would force it to translate downward from the top plate 57 without rotating, a threaded rod could engage a correspondingly threaded hole through the center of the square plate to thereby move the square plate relative to the top plate 57 upon rotation of the threaded rod. A thumbwheel mounted on top of the top plate 57 would of course render the rotation of the threaded rod as needed to provide the extra initial compression of the spring 52 needed for heavier riders.

Moving now to the upper suspension eye bolt 60, a cable 61 attaches this eye bolt 60 to the lower suspension eye 19a from FIG. 2a. Just as the suspension rod 19 passes between the branching down tubes 17a and 17b, either the cable 61 or the eye bolt 60, depending on the position of the slider 51 relative to the seat tube 16, will pass between the branching top tubes of which the tube 13b is the righthand top tube branch. More importantly, the cable 61 permits the slider 51 and seat post 59 to continue their downward travel after the crossbar 19b and the jounce plate 22, both seen in FIG. 2 and FIG. 2a, have arrested the downward arcing travel of the bearing housing 20c.

Figure 6:
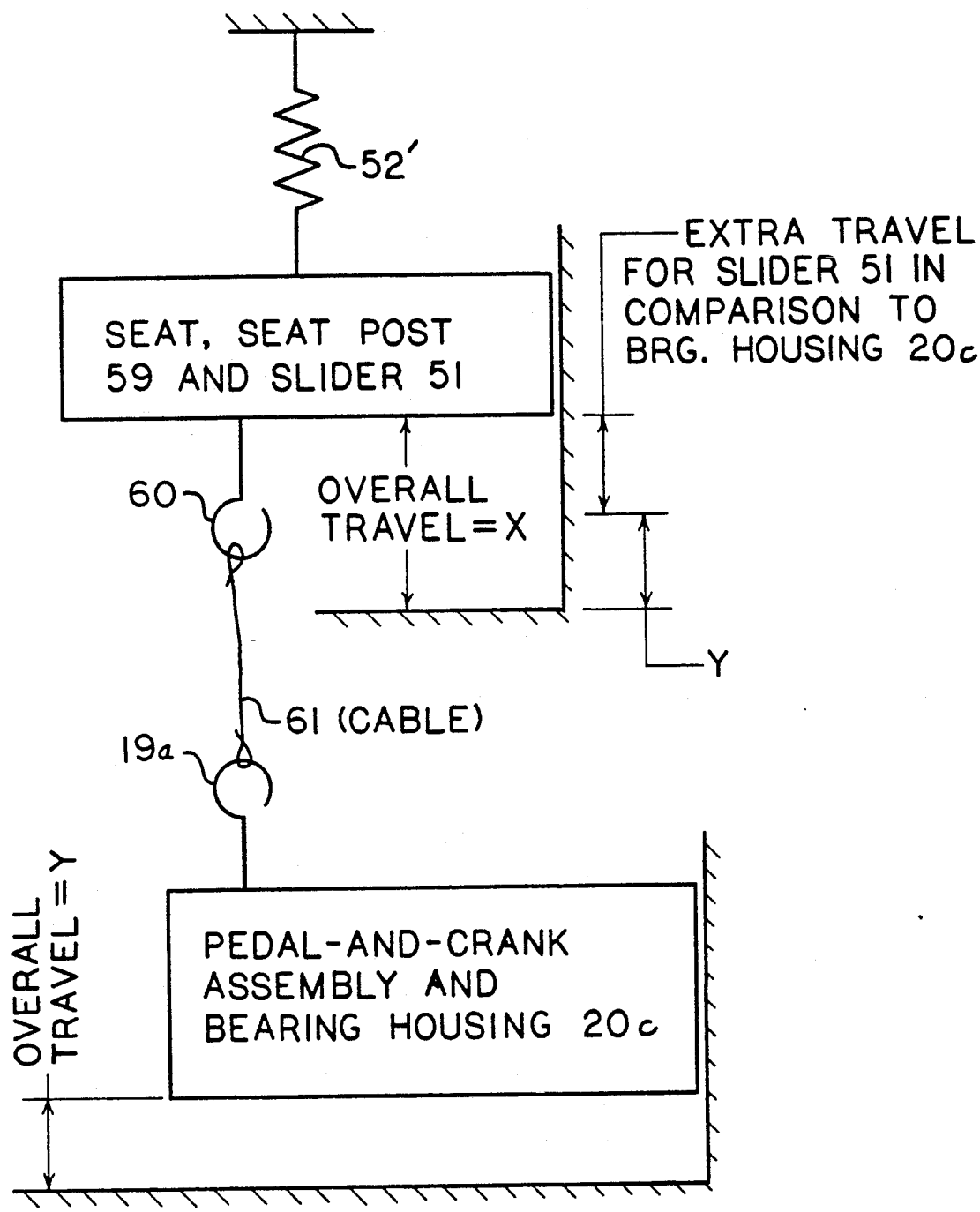
FIG. 6 illustrates the two-stage principle of suspension operation essential for the preferred embodiment of the present invention.

FIG. 6 clearly illustrates, tn a more general way, this very important operational feature of the present invention. As seen in FIG. 6, the distance X represents the full available range of the suspension travel always shared by the slider 51 and the seat of the bicycle 10 with its associated seat post 59. Although the slider 51 does not move in an absolutely vertical direction relative to the main frame 12, FIG. 6 does for convenience represent this relative motion as if the seat tube 16 in FIG. 1 were absolutely vertical. Similarly, the linear motion represented in FIG. 6 for the bearing housing 20c is only a close approximation of the actual relative motion inherent in the embodiment of FIG. 1, but a comparatively simple variation of the bicycle 10 of FIG. 1 would provide true linear motion of the bearing housing 20c relative to the main frame 12. In particular, a downward extension of the seat tube 16 could be used to guide a second, lower slider (fitting outside the tube 16, rather than inside) attached rigidly to the bearing housing 20c.

In any case, the available suspension travel X of the slider 51 for the seat of the bicycle 10 significantly exceeds the full available suspension travel Y of the bearing housing 20c for the pedal-and-crank assembly of the bicycle 10. As a direct consequence, the slider 51 can have a total linear travel of, for example, 5 or 6 inches, while the corresponding full suspension travel of the bearing housing 20c is only about half that amount. This in turn permits the compression spring 52 (operationally represented in FIG. 6 by the tension spring 52 prime) to utilize a relatively soft spring constant without a corresponding increase in the propensity for the suspension system of the bicycle 10 to reach full jounce. In short, a softer, more comfortable suspension spring can still absorb equal energy before bottoming of the suspension system if this softer spring has increased travel over which to absorb the energy. At the same time, though, neither is there increased risk of one of the pedals 39 accidentally hitting the road surface, especially during cornering of the bicycle 10, or of an excessive increase in the height of the riding position for a person pedaling the bicycle 10.

In more detail, the suspension rod crossbars 19b and 19c in FIG. 2a establish the downward and upward limits, respectively, corresponding to the travel Y (FIG. 6) of the bearing housing 20c relative to the main frame 12. (Downward travel of the bearing housing 20c or the seat post 59 relative to the main frame 12 constitutes jounce suspension motion.) When the bicycle 10 encounters only moderately sized bumps in the road surface, this correspondingly moderate overall travel Y of about 2 or 3 inches is enough to deliver a comfortable ride, and the seat slider 51 and crank bearing housing 20c move essentially in unison relative to the main frame 12. A low value of the spring constant for the spring 52 or 52 prime does not, however, mean that the rider of the bicycle 10 will bob up and down with every stroke of the pedals 39 as is the case when only the seat of a bicycle is softly suspended.

In contrast to the situation when only the seat is suspended, the shifting of a portion of the rider's weight from the seat to one of the pedals 39 at the beginning of a pedal downstroke does not appreciably change the loading of the suspension spring 52 or 52 prime because the cable 61 transfers the rider's downward pedal force back to the slider 51 through the eye bolt 60 (FIG. 6) or through the eye bolt 60 and the top plate 57 (FIG. 5). The constantly changing distribution of the rider's weight between the slider 51 and the bearing housing 20c manifests itself mainly in constantly changing tension in the cable 61, rather than in constantly changing compression in the spring 52 or tension in the spring 52 prime.

When the bicycle 10 encounters large bumps in the roadway, the bearing housing 20c will often reach the lower limit of the overall travel Y in FIG. 6, but the slider 51 will be free to continue stretching the sprint 52 prime in FIG. 6, or compressing the spring 52 in FIG. 5, another 3 inches or so because the cable 61 will simply go slack when the bearing housing 20c reaches the lower limit of its travel Y, as determined for the embodiment of FIG. 1 by the crossbar 19b in conjunction with the jounce plate 22 (FIG. 2a). To take a different viewpoint, the upper limit of the longer overall travel X in FIG. 6 is determined by the crossbar 19c in FIG. 2a, just as it is for the shorter travel Y, but the lower limit of the longer travel X is determined by the rubber biscuit 56 and attached plate 55 in FIG. 5.

In consideration now of unsprung weight, the entire bicycle 10 will by itself normally account for only a rather minor fraction of the total weight of the bicycle 10 and a person riding the bicycle 10. Stated conversely, the rider will account for most of this total weight, and therefore suspending just the rider's weight does not incur nearly the same disadvantage as it would in the case of a motorcycle or a passenger car. In fact, the changes in frame geometry that are due to the operation of more conventional long-travel suspension systems, and that are completely avoided by the present invention, almost certainly have more importance than any improvement that could be achieved by suspending a greater portion of the weight of the bicycle 10 itself. Moreover, because of the much lower road speeds typical of bicycles in comparison to motor vehicles, having a very low percentage of unsprung weight is not nearly so important for maintaining secure contact between the vehicle tires and the roadway during rebound motions of the vehicle suspension system. This last fact justifies the rather large ratio of available jounce travel to available rebound travel (both measured from the equilibrium position with the rider aboard) normally exhibited by the present invention as disclosed.

Even so, a small internal combustion engine could be mounted on the pivoted fork 20 to thereby produce the type of motor vehicle usually described as a moped. Similarly, a small electric motor could be mounted on the fork 20 to drive the pedal shaft 50 through suitable reduction gearing, but the batteries for supplying current to this motor would best be carried by the seat slider 51.

Already noted briefly (with reference to FIG. 6) is a modification of the preferred embodiment using a second slider for the bearing housing 20c as well as the slider 51 for the seat post 59. A few other variations will now be mentioned to more fully illustrate the myriad of modifications that can be resorted to without departing from the spirit and scope of the appended claims.

To continue with the idea of using a second, lower slider for the bearing housing 20c, the arrangement for telescoping movement of the slider 51 into and out of the seat tube 16 can be replaced by using a leaf spring to both locate and provide a suspension spring force for the seat post 59, its associated seat and thus the rider of the bicycle 10. In other words, this extensive modification of the preferred embodiment would include the basic leaf-spring type of seat suspension now being marketed under the name, "Allsop Powercurve." Also included, of course, would be the short-travel slider arrangement for the pedal-and-crank assembly and the cable or equivalent tension element connecting the pedal-and-crank assembly with the leaf-spring supported seat.

The next variation to be outlined explicitly addresses the fact that, because of the telescoping movement of the slider 51, the bicycle 10 will not accommodate a very wide range of different sized riders without alteration of the dimensions of the main frame 12. In FIG. 1, the seat tube 16, top tube 13 and the seat stays 31a and 31b are all positioned entirely at or above the location of the down tube 17 and its branches 17a and 17b. Stated equivalently, none of the long tubes of the main frame 12 cross below the slanted straight line which the down tube 17 and its branch 17a describe in FIG. 1 from the steering head 15 all the way back to the axle 29 of the rear wheel assembly 27.

In contrast to this situation, the straight line described in FIG. 1 by the tubes 17 and 17a could, in combination with relocation of the tube 17 to the very top of the steering head 15, define more of an upper limit than a lower limit for positioning of the remaining tubes of the main frame 12. If so, the seat tube 16 would reside mostly below this straight line and be in a position to support the bearing housing 20c directly via an external slider on the tube 16. In short, the very same section of the seat tube 16 would carry both an internal slider for the set and an external slider for the pedal-and-crank assembly. This variation would employ traditional chain stays and a traditional down tube below the tube 17.

Mounting the axle 29 of the rear wheel assembly 27 directly on the pivoted fork 20, rather than directly on the main frame 12, exemplifies much less extensive modifications of the preferred embodiment. Although this particular modification would keep the tension force generated in the chain 31 from being transferred through the pivot for the fork 20, it also entails disadvantages such as movement of the rear wheel 27 relative to the frame 12. While this movement need not be at all substantial, it could still compromise the operation of conventional bicycle caliper brakes. Making the pivot axis 25 for the fork 20 coincident with the rotational axis of the rear wheel 27 as determined by the axle 29 is possible, but not nearly as convenient as the type of pivot disclosed in FIG. 3.

Another example of less extensive modification includes the use of a tension rod in place of the cable 61. Just as the tension rod 19 in FIG. 2a transmits only tension when its upper crossbar 19b is in contact with the jounce plate 22, so too can a single, long rod be arranged to transmit only tension force all the way from the bearing housing 20c to the seat slider 51. Encircling and thus located by this long tension rod could be a second suspension spring for stiffening the extra suspension travel that the seat post 59 has in comparison to the bearing housing 20c.

If, in contrast to stiffening of the extra suspension travel, softening is desired, then the foregoing modification would further encompass using the tension spring 51 prime from FIG. 6 in place of the compression spring 52 shown in FIG. 5. This tension spring 52 prime would be mounted horizontally, parallel to the top tube 13, with its forward end rigidly secured to the steering head 15 and its rearward end attached to a pulley. A cable would attach at a first end to the eye 19a and extend from there to a stationary pulley or guide for directing the cable horizontally to the pulley mounted on the end of the horizontal suspension spring. The cable would return horizontally from the spring-mounted pulley and again be directed almost vertically by another stationary guide or pulley for this purpose. This second end of the cable would Dull upward on the slider 51 via suitable modification of the top plate 57 and upper suspension eye bolt 60. And finally, appropriate adjustment of the added compression spring force now acting to separate the slider 51 and the bearing housing 20c would determine exactly how much softer the suspension travel would become upon contact of the upper crossbar 19b with the jounce plate 22 (FIG. 2a).

Using a horizontally mounted tension spring 52 prime in place of the vertical compression spring 52, with no further modification of the preferred embodiment, offers an opportunity for making the suspension very readily adjustable to thereby quickly compensate for the rider of the bicycle 10 shifting back and forth between an upright riding position and a more aerodynamic position with a greater percentage of weight on the front wheel 37. In more detail, the tension spring 52 prime would, as already noted, be mounted parallel to the top tube 13. Even though the forward end of the horizontal spring 52 prime would be securely anchored to the steering head 15, this unyielding connection would still incorporate manual adjustment of the spacing between the steering head 15 and the forward end of the horizontal spring 52 prime. For example, a handlebar-mounted lever and associated cable could pull the forward anchor point of the spring 52 prime directly toward the steering head 15, or operate a cam for doing so. Such manual adjustment of suspension spring preload could even be made automatic by tying it into a separate suspension system for the handlebars 35, but most recreational bicycle riders, as opposed to enthusiast riders, do not need handlebar suspension because they rarely place much of their body weight on the handlebars. Moreover, the rider's flexed elbow joints inherently absorb road shock, unless racing-style handlebars with forearm rests are used. In any case, separate suspension for the handlebars 35 is optional and would, for reasons already described with reference to unsprung weight, preferably avoid suspension movement of the front wheel 37 relative to the bicycle main frame 12. (Another advantage of using a horizontal version of the tension spring 52 prime is that any guides for directing the cable 61 between a horizontal direction and a direction parallel to the seat tube 16 would inherently add frictional suspension damping.)

As suggested by the previous discussion of FIG. 6, one perspective of the present invention views it as being a two-stage method for suspending the rider of a bicycle. Even though adaptations of motorcycle-type swingarm suspension offer less than ideal performance for bicycles, this two-stage method can utilize the basic rear swingarm approach to suspension as follows. First, most any variation of swingarm suspension would locate what is in effect a frame hinge at a longitudinal position near the rider's weight. Because of this location and because of the low weight of the bicycle itself, this frame hinge will be very effective in suspending the rider's entire weight, so long as the rider maintains an upright seated position. On the other hand, the total suspension travel afforded to the pedal-and-crank assembly by the swingarm configuration would not extend beyond about three inches in order that adequate ground clearance would be available without requiring an excessively high seating position for the rider. This first range of suspension action, as provided by the swingarm mechanism, would obviously be shared by the seat of the bicycle even though the actual motions of the seat and the pedal-and-crank assembly would not be exactly identical relative to a vertical line of reference. In other words, each of the seat and the pedal-and-crank assembly would have a relatively abbreviated range of suspension travel provided by the swingarm mechanism.

This abbreviated travel would, for the seat of the bicycle, be an initial range of jounce travel because the seat would have an entirely separate telescoping suspension mechanism basically as represented in FIG. 5. Which is to say that the cable 61 in FIG. 5 would be deleted and the pre-load in the spring 52 in FIG. 5 would be adjusted so that the slider 51 would remain topped-out against an added rebound travel limiter until just the point at which the swingarm mechanism bottomed out tn jounce motion. This adjustment would require the rider's full weight to be on the seat, and the pedal-and-crank assembly would be excluded from the resulting, second range of jounce suspension action available for the seat. Although the actual apparatus of the preferred variation of the present invention as described with reference to the drawing figures differs markedly from such an extension of the swingarm approach, both approaches do utilize the same basic two-stage method of suspending the rider of a bicycle.

In conclusion, FIG. 6 helps delineate the wide diversity of variations and modifications within the spirit and scope of the following claims. Nevertheless, even FIG. 6 does not fully illustrate this diversity. As an example of this last fact, linking the seat slider 51 to the bearing housing 20c through a solid tension and compression transmitting connection, rather than through the cable 61 for transmitting only tension, would still provide a novel and useful type of bicycle suspension.

What is claimed is:

1. A suspension system for a bicycle, comprising:
   means for providing a range of predominantly vertical motion of a seat used by a rider while pedaling the bicycle, said range of motion being relative to a main structure of the bicycle which positions a front wheel and a rear wheel of the bicycle relative to each other,
   means for providing a spring force for suspending said seat and thus the bicycle rider within said range of motion of said seat,
   means for providing a range of predominantly vertical motion of a pedal-and-crank assembly used by the rider for pedaling the bicycle, said range of motion of said pedal-and-crank assembly being relative to said main structure,
   means for placing a downward limit on said range of motion of said pedal-and-crank assembly to thereby provide ground clearance for pedals of said pedal-and-crank assembly, and
   means for mechanically coupling predominantly vertical motion of said seat, relative to said main structure, to predominantly vertical motion of said pedal-and-crank assembly, also relative to said main structure,
   whereby pedaling by the rider does not cause constantly recurring, significant change in distance between said seat and said pedal-and-crank assembly.

2. The bicycle suspension system of claim 1 wherein (a) said means for mechanically coupling motion of said seat to motion of said pedal-and-crank assembly comprises means for limiting a separation of said seat from said pedal-and-crank assembly to a chosen distance while simultaneously allowing said separation to decrease to a distance less than said chosen distance and (b) the suspension system further comprises means for placing a limit in the downward direction on said range of motion of said seat at a location which reduces said separation to a distance substantially less than said chosen distance when said downward limit of motion of said pedal-and-crank assembly is reached,
   whereby said seat may have a long suspension travel for a more comfortable ride, while said pedal-and-crank assembly has a comparatively abbreviated suspension travel in consideration of ground clearance for pedals of the the bicycle.

3. The bicycle suspension of claim 2 wherein said means for mechanically coupling said seat and said pedal-and-crank assembly comprises a tension cable,
   whereby said cable simply goes slack to thereby allow said separation to decrease below said chosen distance.

4. The bicycle suspension of claim 2 wherein an axle for said rear wheel rigidly attaches to said main structure of the bicycle,
   whereby operation of the suspension system causes no change in position of said rear wheel relative to said main structure of the bicycle.

5. The bicycle suspension system of claim 1 wherein said means for providing a range of motion of said pedal-and-crank assembly comprises a horizontally extending subframe which has a forward structural end relative to forward travel of the bicycle and a rearward structural end opposite said forward structural end and which is (a) adapted at said rearward structural end for pivoting attachment to said main structure about an axis at a location substantially concentric with an axle which attaches said rear wheel to said main structure and (b) adapted at said forward structural end to carry said pedal-and-crank assembly,
   whereby a limited arc of rotation of said pedal-and-crank assembly relative to said main structure provides said range of predominantly vertical motion of said pedal-and-crank assembly relative to said main structure.

6. The bicycle suspension system of claim 5 wherein (a) said means for mechanically coupling motion of said seat to motion of said pedal-and-crank assembly comprises means for limiting a separation of said seat from said pedal-and-crank assembly to a chosen distance while simultaneously allowing said separation to decrease to a distance less than said chosen distance and (b) the suspension system further comprises means for placing a limit in the downward direction on said range of motion of said seat at a location which reduces said separation substantially below said chosen distance when said downward limit of motion of said pedal-and-crank assembly is reached,
   whereby said seat may have a long suspension travel for a comfortable ride, while said pedal-and-crank assembly has a comparatively abbreviated suspension travel in consideration of ground clearance for pedals of the bicycle.

7. The bicycle suspension system of claim 5 wherein said means for providing said motion of said seat relative to said main structure comprises telescoping elements.
   whereby said relative motion of said seat does not cause said seat to rock backward and forward.

8. The bicycle suspension system of claim 7 wherein said telescoping elements comprise (a) a seat tube of said main structure of the bicycle, said seat tube having an inside surface in cross-section normal to said vertical motion of said seat, and (b) a slider which is guided by said inside cross-sectional surface of said seat tube and which is adapted for rigid attachment to said bicycle seat.

9. The bicycle suspension system of claim 8 wherein said means for providing a suspension spring force comprises a compression spring enclosed by said telescoping elements.

10. Bicycle suspension apparatus for providing an overall range of jounce suspension motion for the torso of a rider of a bicycle, said overall range of motion comprising (a) a first range of jounce suspension action sufficient to accommodate relatively small bumps and irregularities encountered by wheels of the bicycle on a road surface over which the bicycle is being ridden and (b) a second range of jounce suspension action which follows said first range of jounce action to thereby accommodate larger bumps and irregularities encountered by the bicycle, the apparatus comprising:

first means for providing only said first range of jounce suspension action for a pedal-and-crank assembly used by the rider for pedaling the bicycle, thereby giving said pedal-and-crank assembly a variable suspension position relative to include said wheels of the bicycle, and second means for providing both of said first and second ranges of jounce suspension action for a seat used by the rider while pedaling the bicycle, thereby giving said seat a variable suspension position relative to said wheels of the bicycle, whereby a comfortable ride is available with neither continuous bobbing up and down of said seat as the rider pedals the bicycle nor a high seating position caused by excessive suspension travel of said pedal-and-crank assembly.

11. The suspension apparatus of claim 10 wherein (a) said first means includes means for limiting to a chosen distance separation in a predominantly vertical direction of said seat from said pedal-and-crank assembly while simultaneously allowing said separation to decrease to a distance less than said chosen distance and (b) said second means includes means for providing a suspension spring force which maintains an equilibrium value within said first range of jounce suspension action for each of said suspension position of said seat and said suspension position of said pedal-and-crank assembly, said equilibrium values existing when the rider is pedaling the bicycle across a perfectly smooth road surface, whereby pedaling does not cause the rider to bob up and down.

12. The suspension apparatus of claim 10 wherein said overall range of suspension motion consists of said first and said second ranges of jounce suspension action.

13. The suspension apparatus of claim 11 wherein said overall range of suspension motion consists of said first and said second ranges of jounce suspension action.

14. The suspension apparatus of claim 10 wherein said means for coordinating said suspension positions comprises tension means for transmitting only tension force, said tension means mechanically linking said suspension position of said seat to said suspension position of said pedal-and-crank assembly, whereby said tension means allows said seat to enter into said second range of jounce suspension action when said pedal-and-crank assembly has completely traversed said first range of jounce suspension action.

15. The suspension apparatus of claim 10 wherein said means for coordinating said suspension positions comprises means for limiting, to a chosen distance, separation in a predominantly vertical direction of said seat from said pedal-and-crank assembly while simultaneously allowing said separation to decrease to a distance less than said chosen distance, said limiting means linking said seat to said pedal-and-crank assembly, whereby said limiting means allows said seat to enter into said second range of jounce suspension action when said pedal-and-crank assembly has completely traversed said first range of jounce suspension action.

16. In a bicycle having a mechanism (a) for suspending a seat relative to a main structure of the bicycle which positions a front wheel and a rear wheel of the bicycle relative to each other and (b) for thereby giving said seat a variable suspension position relative to said main structure of the bicycle, said seat being used by a rider while pedaling the bicycle to thus help isolate the rider from bumps encountered by said wheels of the bicycle; the improvement comprising, in combniation with the bicycle:

first means (a) for providing a range of predominantly vertical motion of a pedal-and-crank assembly used by the rider for pedaling the bicycle, said range of motion being relative to said main structure of the bicycle and (b) for thereby giving said pedal-and-crank assembly a variable suspension position (1) relative to said main structure and (2) within said range of predominantly vertical motion, and second means for coordinating said suspension position of said seat with said suspension position of said pedal-and-crank assembly.

17. The improved bicycle of claim 16 wherein said second means comprises means for transmitting only a tension force substantially between said seat and said pedal-and-crank assembly, said tension force being in a predominantly vertical direction.

18. The improved bicycle of claim 16 wherein said second means comprises coordinating means for limiting, to a chosen distance, separation in a predominantly vertical direction of said seat from said pedal-and-crank assembly while simultaneously allowing said separation to decrease to a distance less than said chosen distance, said coordinating means linking said seat to said pedal-and-crank assembly, whereby said coordinating means allows said seat to continue moving in jounce suspension travel after said pedal-and-crank assembly has bottomed out in jounce suspension travel.

19. The improved bicycle of claim 18 wherein said apparatus comprises a tension cable.

20. The improved bicycle of claim 18 further comprising means for placing a limit in a jounce direction on said suspension position of said seat and means for placing a limit in a jounce direction on said suspension position of said pedal-and-crank assembly, said jounce limit of said pedal-and-crank assembly being reached well before said jounce limit of said seat when said apparatus is limiting said separation to said chosen distance.

* * * * *